United States Patent [19]
Hallman et al.

[11] Patent Number: 5,347,473
[45] Date of Patent: Sep. 13, 1994

[54] COIN COUNTING CALCULATOR

[76] Inventors: Charles D. Hallman, 4520 Newberry, Wayne, Mich. 48184; Dennis P. McElhone, 80 Groveland, Howell, Mich. 48843

[21] Appl. No.: 125,174

[22] Filed: Sep. 23, 1993

[51] Int. Cl.$^5$ .................... G06F 3/00; G09B 19/18
[52] U.S. Cl. ................... 364/709.02; 434/110
[58] Field of Search ............ 364/709.02; 434/110; 273/273

[56] References Cited

U.S. PATENT DOCUMENTS

| | | |
|---|---|---|
| 3,488,864 | 1/1970 | McManus . |
| 4,308,588 | 12/1981 | Siwula . |
| 4,571,189 | 2/1986 | Shank . |
| 4,752,227 | 6/1988 | Yamin ................................ 434/110 |
| 4,959,017 | 9/1990 | Thompson et al. . |

*Primary Examiner*—Tan V. Mai
*Attorney, Agent, or Firm*—Richard C. Litman

[57] ABSTRACT

An electronic calculator allows a user to quickly add up change. The user simply pushes one of the coin switches clearly marked to represent a particular coin denomination in order to add up the change. Each time a coin switch is activated, an accumulated sum is incremented by a value associated with the value of the coin denomination represented by the activated coin switch. The accumulated sum is then displayed to the user. If the user depresses the wrong coin switch, an error switch is provided which subtracts the previous entry made from the tabulated sum to arrive at the tabulated sum previous to the depression of the coin switch.

4 Claims, 2 Drawing Sheets

COIN COUNTING CALCULATOR

BACKGROUND OF THE INVENTION

1. Field of the Invention

The present invention relates to electronic calculators used for tabulating a total sum of money. More particularly, the present invention pertains to those electronic calculators having coin push buttons dimensioned to have a diameter substantially equivalent to the diameter of a particular coin denomination and used to increment a displayed number by the value associated with that particular coin denomination.

2. Description of the Prior Art

Devices for the tabulation of money have been proposed for specialized purposes, e.g., education or balancing a checkbook. Electrical calculators designed for the purpose of tabulating money include desk top units or portable units small enough to fit into a checkbook. Mechanical devices for the tabulation of money include games, calculators, cash registers, and others.

U.S. Pat. No. 4,959,017 issued Sep. 25, 1990 to Barbara J. Thompson et al discloses an electronic calculating device for teaching user of the device how to handle money. The device has several programs to provide a variety of question and answer sessions to the user.

U.S. Pat. No. 4,308,588 issued Dec. 29, 1981 to John T. Siwula discloses a portable calculator for balancing a checkbook. One of the features of the device allows tile user to key-in a monetary amount and perform a "trial balance" operation which updates the remainder of the user's balance for each entry.

U.S. Pat. No. 3,488,864 issued Jan. 13, 1970 to Catherine T. McManus discloses a mechanical device for improving the monetary skills of the user. The device is designed to receive ten pennies located above two nickels located above one dime.

U.S. Pat. No. 4,571,189 issued Feb. 18, 1986 to Spencer L. Shank discloses a board using overlays having a predetermined number of printed coins thereon for allowing a user to count the printed coins and associate a predetermined number of coins with another single coin or paper bill printed thereon.

None or the above inventions and patents, taken either singly or in combination, is seen to describe the instant invention as claimed.

SUMMARY OF THE INVENTION

The coin counting calculator of the present invention is used for tabulating coins in incremental steps associated with the value of the individual denominations of the coins. The calculator includes a plurality of coin pushbuttons, each one thereof representing the magnitude of the value of a particular coin denomination. A display, preferably a liquid crystal (LCD) display is used to indicate the tabulated sum of money. Each time a particular coin pushbutton is depressed, the tabulated sum is incremented by the value of the coin denomination that particular coin pushbutton represents. A clear button resets the calculator and an error button decrements the tabulated sum by the value of the previous entry so as to subtract the last entry from the tabulated sum. The calculator also has a display select switch to change the format of the display. The calculator is preferably solar powered.

Accordingly, it is a principal object of the invention to provide a handheld portable coin calculator which is easily transported.

It is another object of the invention to provide such a calculator which is easily tabulates coins by pushing one button.

It is a further object of the invention to provide pushbuttons readily identifiable with a particular coin denomination.

Still another object of the invention is to allow the user to change the format used by the display in indicating the amount of the tabulated sum.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
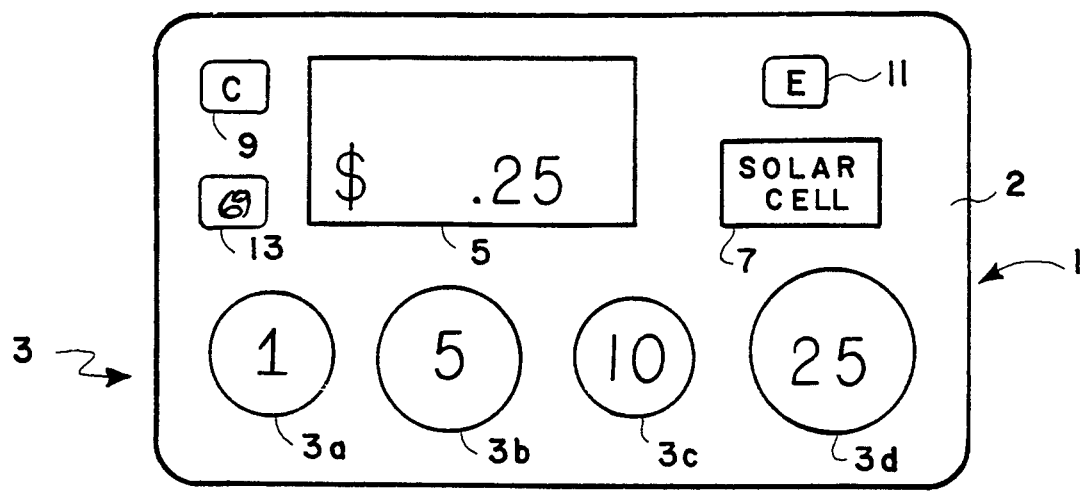
FIG. 1 is a top view of the device of the present invention illustrating one display format.

As illustrated in FIG. 1, the coin counting calculator 1 has a top face 2 including a plurality of pushbuttons 3 located thereon, each one representing a particular coin denomination. A first pushbutton 3a represents a magnitude of the value of a penny, e.g. one cent. A second pushbutton represents a magnitude of the value of a nickel, e.g. five cents. Likewise, the pushbuttons 3c and 3d represent magnitude associated with the value of a dime and a quarter, respectively, e.g. ten and twenty-five cents. The coin counting calculator 1 is preferably powered by solar cell 7 when exposed to light. Alternatively, or in addition to the solar cell 7, an electric battery may be included in the calculator 1 as the sole or as the alternate power source. If both solar cell 7 and a battery are included in the coin counting calculator 1, a switch would have to be provided for selecting between the two alternate power sources.

Each time one of the pushbuttons 3 is depressed, a tabulated sum is incremented by a step value equal to the magnitude of the value of the coin denomination that particular pushbutton 3 represents. This tabulated sum is indicated by the display 5. As shown in FIG. 1, the sum of twenty-five cents is displayed. This may be accomplished by the first depression of pushbutton 3d after the calculator is cleared, by the fifth depression of the pushbutton 3b after the calculator is cleared, or by any other combination of depressions of the pushbuttons 3 which result in a sum of twenty-five cents. Note that it is not necessary for the user to depress any other button to tabulate an amount of change, i.e. an additional function button is not required to be depressed in order to tabulate the sum indicated on display 5.

Figure 3:
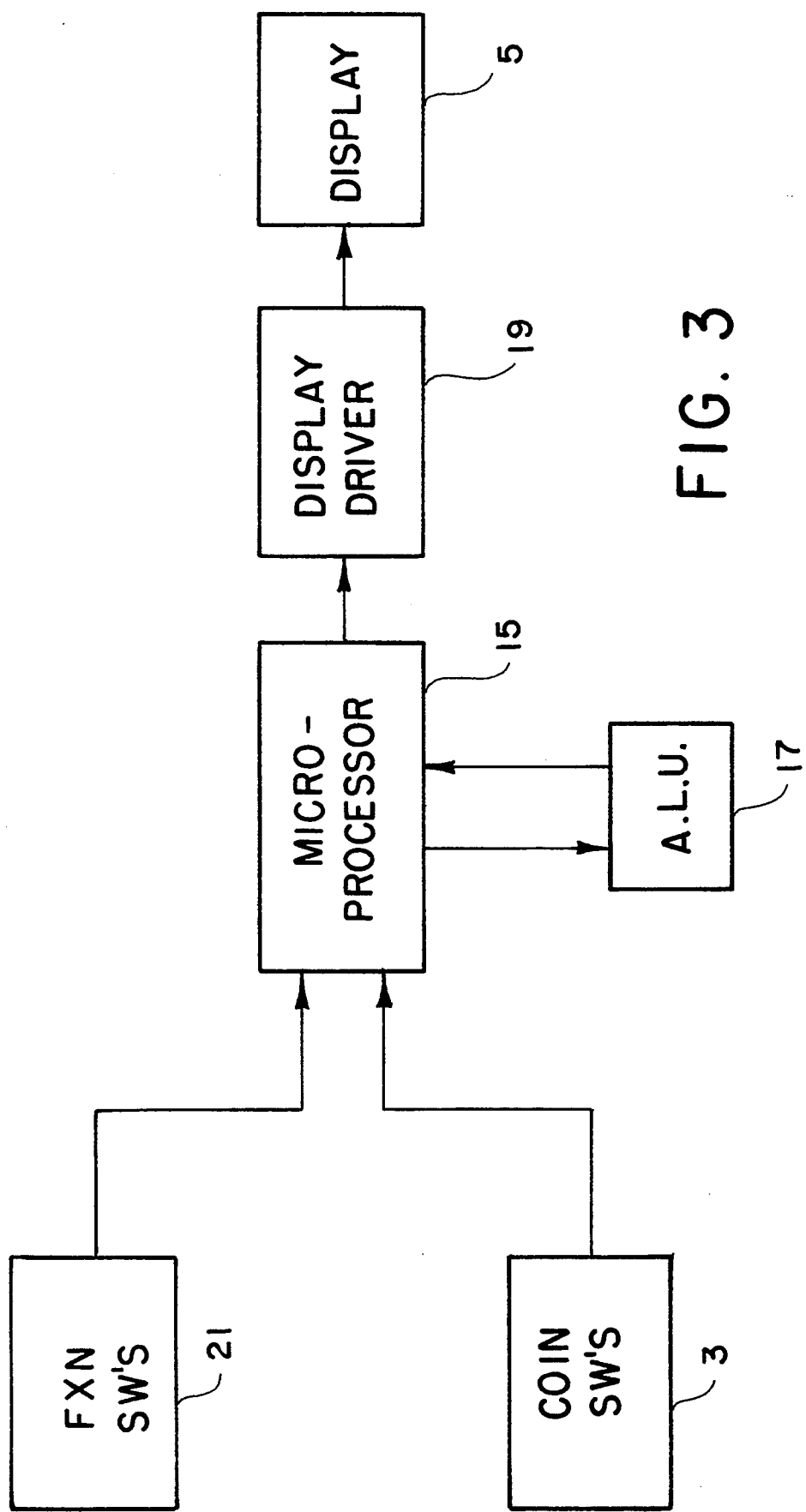
FIG. 3 is an electrical block diagram of the present invention.

A clear button 9 is used to reset the tabulated sum back to zero. Further, an error pushbutton 11 is used to decrement the tabulated sum by the value previously tabulated thereto. In this manner, if the user makes a mistake by depressing the wrong coin pushbutton 3, the user need only depress the error pushbutton 3 to arrive at the tabulated sum before he or she made the mistake. As illustrated in FIG. 3, a display select pushbutton 13 is used to alternate the format of displaying the tabulated sum. Each of the pushbuttons of the pushbuttons 9, 11, and 13 are marked with a symbol easily associating each with their respective function. The clear pushbutton 9 has a "C" printed thereon, the error pushbutton 11 has an "E" printed thereon, and the display select switch 13 has the ying-yang symbol printed thereon. In this manner the user can readily identify the function of each pushbutton 9, 11, and 13.

Figure 2:
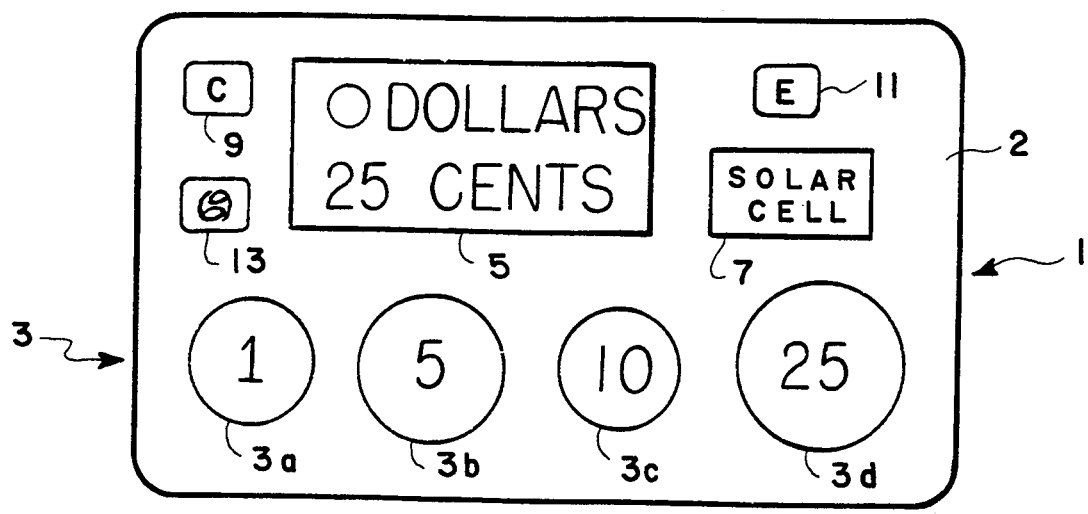
FIG. 2 is a top view of the device of the present invention illustrating another display format.

The display 5 as illustrated in FIG. 1, depicts one format for displaying the tabulated sum. The same display 5 illustrated in FIG. 2 depicts an alternate display format for indicating the tabulated sum. As stated above, alternating between one display format or the other display format is accomplished by depressing the pushbutton 13. The ying-yang symbol is printed on the pushbutton 13 to readily illustrate that alternating feature of the display select button 13.

In the preferred embodiment, the pushbuttons 3 each have an attachment means associated therewith, e.g. raised edges, for allowing the user to securely place a coin thereover to readily identify the coin denomination associated with the particular pushbutton 3. In this manner, a penny may be placed over the pushbutton 3a, a nickel over pushbutton 3b, a dime over pushbutton 3c, and a quarter over pushbutton 3d. Alternatively, artificial coins or labels may be securely attached over each of the pushbuttons 3.

FIG. 3 illustrates the electronic circuitry needed to perform the operations identified above. A microprocessor 15 is used as the central controller of all operations and contains the necessary memory and software needed to carry out the operations described above. More specifically, the microprocessor contains step value buffers for storing in specific locations the individual magnitudes representing the value of each of the coin denominations depicted by the coin pushbuttons 3. In this manner a particular step value buffer has the value one stored therein, another step value buffer has the value five stored therein, and two other step value buffers have the values of ten and twenty-five stored therein. The microprocessor 15 also has a buffer for storing the tabulated sum. Upon depression of one of the coin pushbuttons 3, the value represented by the magnitude of the coin denomination represented by that pushbutton 3 is added to the tabulated sum through the use of a conventional arithmetic logic unit, A.L.U 17.

As described above, each of the function buttons 21, e.g. clear pushbutton 9, error pushbutton 11, and display select pushbutton 13, also control the display 5. A previous value input buffer is used to store the appropriate value represented by the magnitude of the value of the coin denomination represented by a particular coin pushbutton 3 upon the depression of that pushbutton 3. As stated above, the tabulated sum is incremented by the appropriate value upon the depression of that particular pushbutton 3. In this manner, if the error pushbutton 11 is depressed directly afterwards, the microprocessor outputs the data in the previous value input buffer to the A.L.U. 17 along with the tabulated sum so as to subtract the data in the previous value input buffer from the tabulated sum. The output of the A.L.U. 17 is then stored in the memory location designated for the tabulated sum so that the new value thereof reflects that value before the depression of the previously depressed coin pushbutton 11.

It is to be understood that the present invention is not limited to the sole embodiment described above, but encompasses any and all embodiments within the scope of the following claims.

We claim:

1. An electronic calculator for calculating monetary values of coins, said calculator comprising:
   a plurality of manually activated coin switches, each said coin switch representing a magnitude of a value of a particular coin denomination;
   an accumulator for storing a tabulated sum;
   step value storage means for storing a plurality of step values, each one thereof having a magnitude equal to one of said magnitudes representing the value of one of said particular coin denominations;
   incrementing means, responsive to the activation of one of said plurality of coin switches, for incrementing the tabulated sum by a one of said plurality of step values having a magnitude equal to the magnitude of the value of the coin denomination associated with said activated coin switch;
   a previous value input buffer for storing a previous input value equal to the magnitude associated with the value of the particular coin denomination of said activated coin switch;
   a decrement switch;
   decrementing means for decrementing said tabulated sum by said previous value input upon activation of said decrement switch in order to arrive at a value for said tabulated sum equal to a previous value thereof before the depression of said activated coin switch;
   a clear switch for resetting said tabulated sum stored in said accumulator, said display number stored in said output buffer, and said previous input value stored in said previous input value buffer to zero; and
   display means for displaying said accumulated sum;
   whereby the monetary values of coins are independently calculated by activating said coin switches for the appropriate coin denominations.

2. An electronic calculator as claimed in claim 1, further comprising a solar panel for generating electrical energy used to run said electronic calculator.

3. An electronic calculator according to claim 1, further comprising a display select switch for choosing one of a plurality or display formats used by said display means to display the display number.

4. An electronic calculator according to claim 1, further comprising means for securely receiving a coin on top of each of said manually activated coin switches.

* * * * *